United States Patent [19]

Utagawa et al.

[11] Patent Number: 4,812,868
[45] Date of Patent: Mar. 14, 1989

[54] DETECTING APPARATUS FOR FOCUS IN CAMERA

[75] Inventors: Ken Utagawa, Kawasaki; Yoshinari Hamanishi, Tokyo, both of Japan

[73] Assignee: Nikon Corporation, Tokyo, Japan

[21] Appl. No.: 212,170

[22] Filed: Jun. 29, 1988

Related U.S. Application Data

[63] Continuation of Ser. No. 30,054, Mar. 25, 1987, abandoned.

[30] Foreign Application Priority Data

Mar. 28, 1986 [JP] Japan .................................. 61-70525

[51] Int. Cl.⁴ .............................................. G03B 3/00
[52] U.S. Cl. .................................... 354/402; 354/406
[58] Field of Search .............. 354/400, 402, 403, 406, 354/407, 408, 409, 286

[56] References Cited

U.S. PATENT DOCUMENTS

| | | | |
|---|---|---|---|
| 4,473,287 | 5/1984 | Fukuhara et al. | 354/409 |
| 4,602,861 | 7/1986 | Taniguchi et al. | 354/403 |
| 4,673,275 | 6/1987 | Nakai et al. | 354/286 X |

FOREIGN PATENT DOCUMENTS 208514 11/1984 Japan .

*Primary Examiner*—W. B. Perkey
*Attorney, Agent, or Firm*—Shapiro and Shapiro

[57] ABSTRACT

A detecting apparatus for focus in a camera has a memory storing at least two independent rates indicating an aberration of a photographing lens. The memory is provided on an interchangeable photographing lens. If an optical characteristic of the focus detecting apparatus within the camera body changes from a conventional one, a suitable aberration correction rate is decided accordingly on a camera body side, thereby ensuring a high precision focus detection then forward.

20 Claims, 6 Drawing Sheets

FIG. 3A
FIG. 3B
FIG. 3C
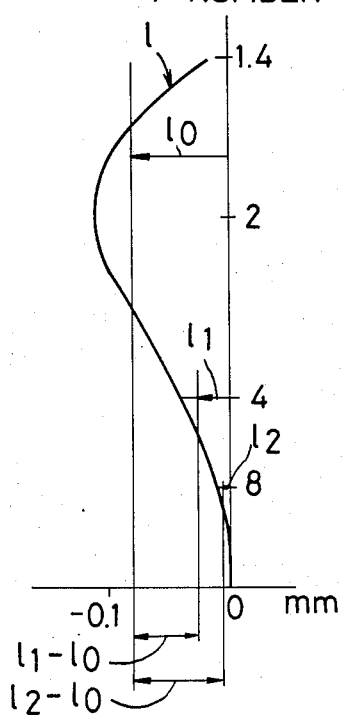
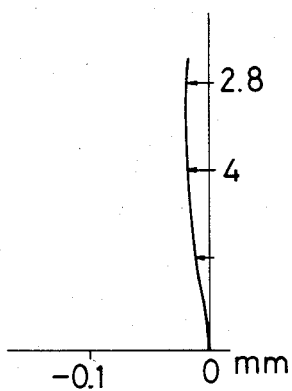
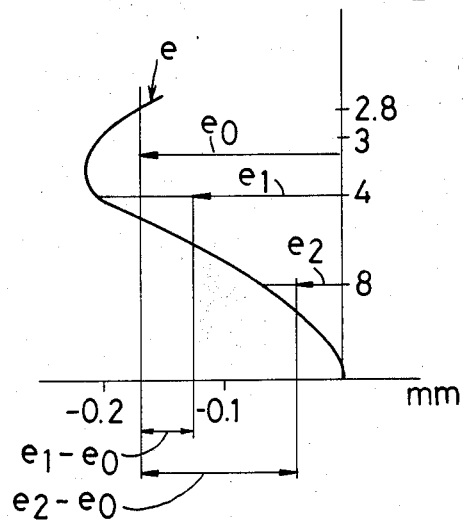

DETECTING APPARATUS FOR FOCUS IN CAMERA

This is a continuation application of Ser. No. 030,054 filed Mar. 25, 1987, now abandoned.

BACKGROUND OF THE INVENTION

1. Field of the Invention

The present invention relates to a detecting apparatus for focus in a camera, and is particularly concerned with a technique for detecting focus in high precision in consideration of aberration of a photographing lens.

2. Related Background Art

Generally, an F-number of the focus detection optical system is constant regardless of a photographing lens, and a focus detecting plane is set at the optimum image plane in the F-number of the focus detection system. On the other hand, it is known that a position of the optimum image plane shifts according as a stop of the lens changes in size due to a spherical aberration of the photographing lens. Accordingly, if a stop vaue to be controlled practically at the time of photographing varies from the F-number of the focus detection system, then there may be a case where the optimum image plane is dislocated against the optimum image plane position decided by the focus detection system.

To solve the aforementioned problem, U.S. Pat. No. 4,473,287 discloses a technique for providing a means for reading a signal to identify a lens type and deciding a data on a spherical aberration of the lens which is provided in a photographing lens assembly and a means for correcting the optimum image plane position from the spherical aberration data within a camera body.

However, the prior art requires a memory coordinating a correction rate of the optimum image plane position from a type of the aberration and the F-number controlled at the time of photographing provided within the camera body. Therefore many memories will be required for covering the type of each aberration of a variety of photographing lenses. Particularly in the case of a zoom lens, since the type of aberration is totally different at every zooming position, an enormous storage is required in the camera body, creating problems of cost and capacity as well.

Then, a further problem occurs when a type of aberration of a photographing lens manufactured later does not belong to any previous type, so that there is no coordination with the camera body having such memories.

Japanese Pat. No. 208514/1984 laid open on Nov. 26, 1984 discloses a camera automatic focus detecting apparatus including a photographing lens provided with a means for storing a correction rate of the optimum image plane position coordinating with a spherical aberration characteristic.

In taking note particularly of the phenomenon that a direction of correction for matching the optimum image plane position of a photographing lens detected by a photosensor with a film plane varies according to a spherical aberration characteristic of each lens, the aforementioned prior art is characterized in that information on the correction value and direction is transferred to a focusing device of the camera body from the photographing lens, and focusing is effected so as to match the optimum image plane with the film plane with the corrections taken into consideration by the focusing device.

Contrary to the aforementioned U.S. Patent, the camera body according to the Japanese Patent is advantageous in respect of a capability to cope with every type of aberration of the photographing lens developed later, but a defect is that a correction rate incorporated on the photographing lens side is determined on the premise that the focus detection system having a specific F-number is incorporated in the camera body. Therefore if the F-number of a focus detection system of the camera body developed later varies from the previous one, then the correction rate incorporated in the lens can no longer be applied to the focus detection system.

Further, the case where the focus detection system of the camera body has a plural or variable F-number is also not accommodated.

SUMMARY OF THE INVENTION

An object of the invention is to provide a correction system of a focus detecting apparatus capable of coping suitably with a camera body provided with a photographing lens with a new type of aberration characteristic and/or a new type of focus detecting apparatus, thus serving for appropriate correction.

Another object of the invention is to provide a camera system and a photographing lens wherein a memory storing at least two independent rates indicating an aberration of a photographing lens is provided on an interchangeable photographing lens, and if an optical characteristic of the focus detecting apparatus within the camera body changes from a conventional one, a suitable aberration correction rate is decided accordingly on the camera body side, thereby ensuring a high precision focus detection thenceforward.

A further object of the invention is to provide a camera system available for aberration correction correspondingly to each case where the focus detecting apparatus has a plurality of F-numbers and also a plurality of infrared cut-off filters varying in characteristics.

BRIEF DESCRIPTION OF THE DRAWINGS

FIGS. 3A, 3B and 3C are charts each showing a spherical aberration of the photographing lens;

DESCRIPTION OF THE PREFERRED EMBODIMENT

Figure 1:
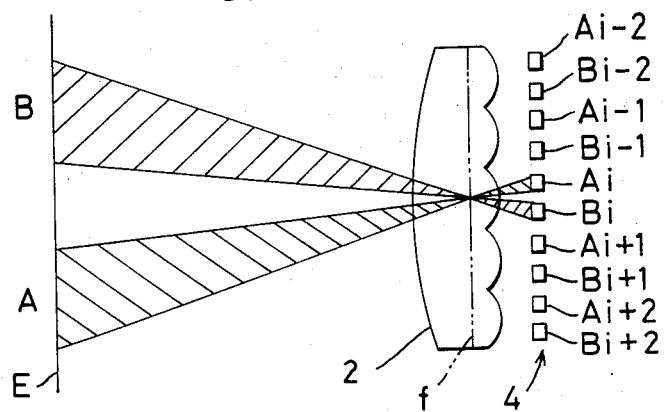
FIG. 1 is a schematic view of an optical system and a detector of a focus detecting apparatus.

One example of a focus detecting apparatus is shown in FIG. 1. The apparatus comprises irradiating light of two domains A, B symmetrical with reference to the optical axis in a projection eye E of a photographing lens and impinging upon self scanning photoelectric element arrays 4, wuch as a CCD image sensor or an MOS image sensor, through a lens array 2 disposed at a position conjugate with a film plane, thereby detecting a focus according to a phase difference between output signals from the photoelectric element arrays 4. Light from the domain A of the projection eye E is incident on a group A ($A_o \ldots A_i \ldots A_n$) of the photoelectric element arrays 4, and light from the domain B of the projection eye E is incident on a group B ($B_o \ldots B_i \ldots B_n$) of the photoelectric element arrays 4. Therefore the output signal of each photoelectric element array group functions as a signal indicating a subject image created by the light coming from a domain of the projection eye corresponding thereto.

Figure 2A:
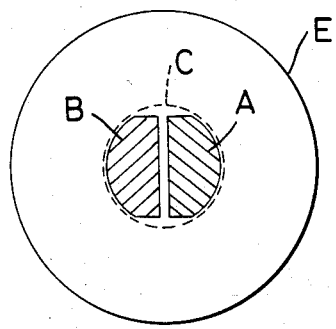
FIGS. 2A, 2B and 2C are schematic views each representing a projection eye of a photographing lens.

The two domains A, B appear as shown in FIG. 2A when viewed in the direction of the optical axis. Here, a size of a domain C corresponding to a circumscribed circle of the two domains A, B corresponds to an F-number $F_s$ of the focus detection system.

Generally, even if the focus detecting apparatus is adjusted both electrically and mechanically so as to output a focusing indication when the optimum image plane position under a fully open aperature state of a photographing lens coincides with the film plane, the adjustment will not necessarily be correct for a photographing lens varying in aberration characteristic.

However, when influence of chromatic aberration due to light source and film is minimized, the following situation may hold.

According to an experiment, when the focus detecting apparatus is adjusted electrically and mechanically so as to output a focusing indication for a subject image formed on an optimum image plane by a lens controlled to an F-number almost equal to the F-number $F_s$ of the focus detection system (typically a 50 mm/F1.4 photographing lens, for example), the optimum image plane when the focus detecting apparatus outputs the focusing indication for other photographing lenses will coincide almost correctly with the film plane. This has also been confirmed in a simulation result obtained through computation in which the position whereat principal rays of two luminous fluxes having passed a pair of domains A, B in the projection eye coincide with each other is considered as a focusing position with the optimum image plane at a peak position of modulation transfer function 30 lines/mm.

Accordingly, if a difference in the optimum image plane between an F-number $F_o$ of the full open aperture and the F-number $F_s$ of the focus detection system is called a reference deviation $\delta_o$, then the focus detection position becomes a discrepant by the reference deviation $\delta_o$ for every photographing len.

Now, the description will proceed on the assumption that the focus detecting apparatus is properly adjusted as mentioned above.

FIG. 3A represents a spherical aberration of a typical photographing lens with an aperture value F1.4, wherein optimum image planes at F1.4, F4 and F8 are separated from near axis image points by $l_0 = -80$ μm, $l_1 = -30$ μm and $l_2 = -10$ μm each. Accordingly, the reference deviation $\delta_o$ of the lens is $l_1 - l_0 = 50$ μm or $l_2 - l_0 = 70$ μm for the focus detection system F-number $F_s = 4$ or 8. Therefore in the case of $F_s = 4$ or 8, the optimum image plane at full open aperture is deviated by 50 or 70 μm from the focusing indication position.

Since the depth of focus at F1.4 is 40 to 50 μm at the utmost, this does not come within the depth of focus for the full open aperture.

In the case of a lens having a spherical aberration shown in FIG. 3B, the image plane will almost not shift from stopping down, and the reference deviation $\delta_o$ becomes almost zero in the case of $F_s = 4$ and $F_s = 8$. In any case, the focusing indication position is almost coincident with the optimum image plane position at full open aperture.

Spherical aberration of the lens in FIG. 3C is 0.2 mm or so when the aperture value is F2.8. The optimum image planes at F2.8, F4 and F8 are $e_0$, $e_1$ and $e_2$ away from the near axis image points respectively. The reference deviations $\delta_o$ for the focus detection systems at $F_s = 4$ and 8 are $e_1 - e_0 = 40$ μm and $e_2 - e_0 = 130$ μm, and hence the optimum image plane at the full open aperture will be deviated by 40 μm or 130 μm with respect to the focusing indication position in the case of $F_s = 4$ or 8. In this case, since the depth of focus is 90 μm for the aperture value $F_o = 2.8$, and when $F_s = 8$, deviation is not within the depth of focus for the full open aperture.

Figures 4A, 4B:
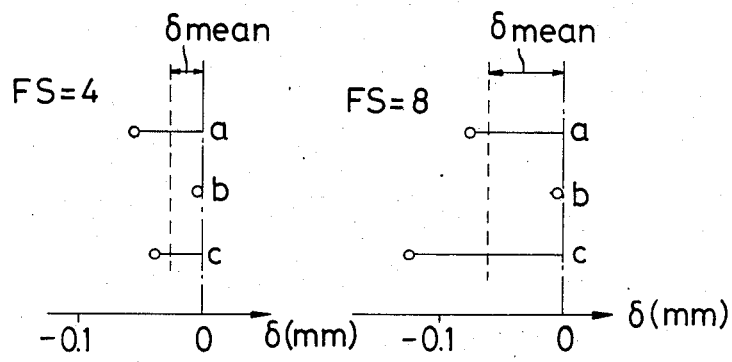
FIGS. 4A and 4B are charts each showing an aberration correction rate.

The cases where $F_s = 4$ and $F_s = 8$ are indicated in FIG. 4A and FIG. 4B, summing up what has been described above. In the drawings, reference characters a, b, c denote the reference deviations $\delta_o$ in FIGS. 3A, 3B and 3C respectively.

As will be apparent from each drawing, a dispersion of the optimum image plane is preferably minimized according as the F-number $F_s$ of the focus detection system comes near to the full open aperture $F_o$ of the photographing lens. The reason why the dispersion of full open optimum image plane is particularly considered here is that the depth of focus is then smallest. However, it is necessary to enlarge $F_s$ to some extent for ease of focus detection on the lens with comparatively large $F_o$.

Thus the relation between the F-number of a focus detection system and the reference deviation $\delta_o$ varies according to the photographing lens, and even where data on the reference deviation $\delta_o$ at a certain $F_s$ is stored within the lens as a correction rate, the reference deviation $\delta_o$ cannot be estimated when the lens is applied to a camera with another size of $F_s$. Now, therefore, in the embodiment, first data and second data on the spherical aberration are stored in a memory within the photographing lens, and thus a pertinent aberration correction rate is determined within a camera body to the focus detection system having an arbitrary F-number $F_s$, thereby effecting focus detection with high precision.

Some examples of the correcting method will be given as follows:

The first data indicating the optimum image plane difference between full open aperture and F4 and the second data indicating the optimum image plane difference between full open aperture and F8 are stored in the memory of the photographing lens, the two data are read on the camera body side, and the reference deviation $\delta_o$ in the arbitray F-number $F_s$ is computed in the following form as a correction rate $\delta$.

$$\delta = \alpha \times (\text{first data}) + \beta \times (\text{second data}) \quad (1)$$

where $\alpha$, $\beta$ are rates stored on the camera body side, which are properly decided according to the F- number $F_s$ of the focus detection system within the camera body.

The following table exemplifies how to decide $\alpha$ and $\beta$:

TABLE

| $F_s$ | ex. 1 | | ex. 2 | |
|---|---|---|---|---|
| | $\alpha$ | $\beta$ | $\alpha$ | $\beta$ |
| 4 | 1 | 0 | 0.2 | 0.8 |
| 5 | 0.5 | 0.5 | 0.5 | 0.5 |
| 8 | 0 | 1 | 0.9 | 0.1 |

Generally an optimum value is determined within the range of $0 \lesssim \alpha \lesssim 1$ and $0 \lesssim \beta \lesssim 1$ experimentally, however, it is preferable that the value be determined in the form of $\alpha + \beta \approx 1$.

When the case of ex. 1 of the table is applied to the photographing lens of FIG. 3C, the first data=40 $\mu$m and the second data=130 $\mu$m as stored in the lens in this case. Therefore the correction rate $\delta$ is obtained at 40 $\mu$m at the time of $F_s=4$, the correction rate $\delta$ is obtained at 130 $\mu$m at the time of $F_3=8$, and further the correction rate $\delta$ will be obtained at 85 $\mu$m which is an intermediate value at the time of intermediate F-number or, for example, $F_5=5$ which is free from direct data.

As described, the correction rate can be determined to an arbitrary F-number $F_s$ by storing a plurality of data in the memory within the lens. Then, it is advisable that a practical correction rate be taken somewhat smaller by multiplying $\delta$ decided as above by a coefficient P ($0 \leq P \leq 1$) so as to keep an excessive correction from arising due to various errors present. In such case it is realistic to keep P within the range of $0.4 \leq P \leq 1$ or so.

Various formats will be conceivable for how to correct concretely. For example, with the center value of dispersion of the optimum image plane positions shown in FIGS. 4A and 4B as $\delta_{mean}$, a position of the focus detecting apparatus can be adjusted so as to give a focusing indication when a position of $\delta_{mean}$ coincides with the film plane.

Only that for which the correction rate $\delta$ is sharply discrepant to $\delta_{mean}$ can be corrected. The correction rate in such case will be given by $P \times (\delta - \delta_{mean})$. In this case, $\delta$ cannot be decided unless an F-number of the focus detection system is known, therefore a plurality of data on spherical aberration will be required on the photographing lens side likewise.

Figure 2B:
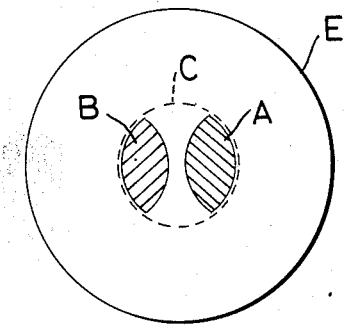
Figure 2C:
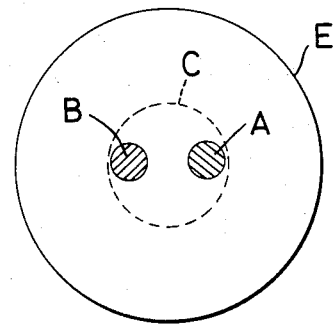

A manner of deciding $\alpha$, $\beta$ is not necessarily limited to what has been exemplified above, and it is conceivable that these may vary according as the detection eyes change in shape as shown in FIGS. 2B and 2C. Therefore, it is necessary that an optimum value be decided practically according to F-number of the focus detection system and the eye shape.

It is then preferable that two F-numbers functioning as a base for the first and second data be decided as follows:

In consideration of the photographing lens being brighter than F=5.6 in most cases, it is preferable that the greater F-number be determined within the range of F6 to F10 on the premise that these may not give rise to vignetting, and values of F7 to F8 or so are preferred. Unless they differ in value by 1.5 times or more, independence of the two F-numbers will become meaningless. It is structurally difficult to keep F-number of the focus detection system at $F_s<3$, therefore the smaller F-number will be proper at F3 to F6 and optimum at F4 to F5 or so.

A brief description will be given on how to prepare another aberration correction data. With two F-numbers of the first and second data kept at values whereby the ratio to the full open F-number $F_0$ becomes constant, or $k_1 \times F_0$ and $k_2 \times F_0$, two aberration correction data can also be given according to a difference between the optimum image plane position at each of the two F-numbers and the optimum image plane position at full open aperture. In this case, F-numbers of the first and second data may vary according to the full open F-number $F_0$ of the photographing lens. However, if the full open F-number $F_0$ of the photographing lens is transferred to the camera body side, then the extent of deviation of the optimum image plane position at the F-number $F_s$ from the full open optimum image plane position can be computed.

Now, let it be assumed that a deviation between the optimum image plane position at $F_0$ and the optimum image plane position at $k_1 \times F_0$ be the first data $s_1$, and a deviation between the optimum image plane position at $F_0$ and the optimum image plane position at $k_2 \times F_0$ be the second data $s_2$, then the correction rate $\delta$ to full open aperture will be given by a proper interior division calculation to obtain $\delta = s_1$ at $F_s = k_1 \times F_0$ and $\delta = s_2$ at $F_s = k_2 \times F_0$, which is exemplified as:

$$\delta = s_1 + (s_2 - s_1) \times \frac{k_2 - k_1 k_2 F_0 / F_s}{k_2 - k_1}$$

where conditions of $k_1 = 2$ or 3 and $k_2/k_1 \gtrsim 1.5$ should preferably be satisfied.

Figure 5:
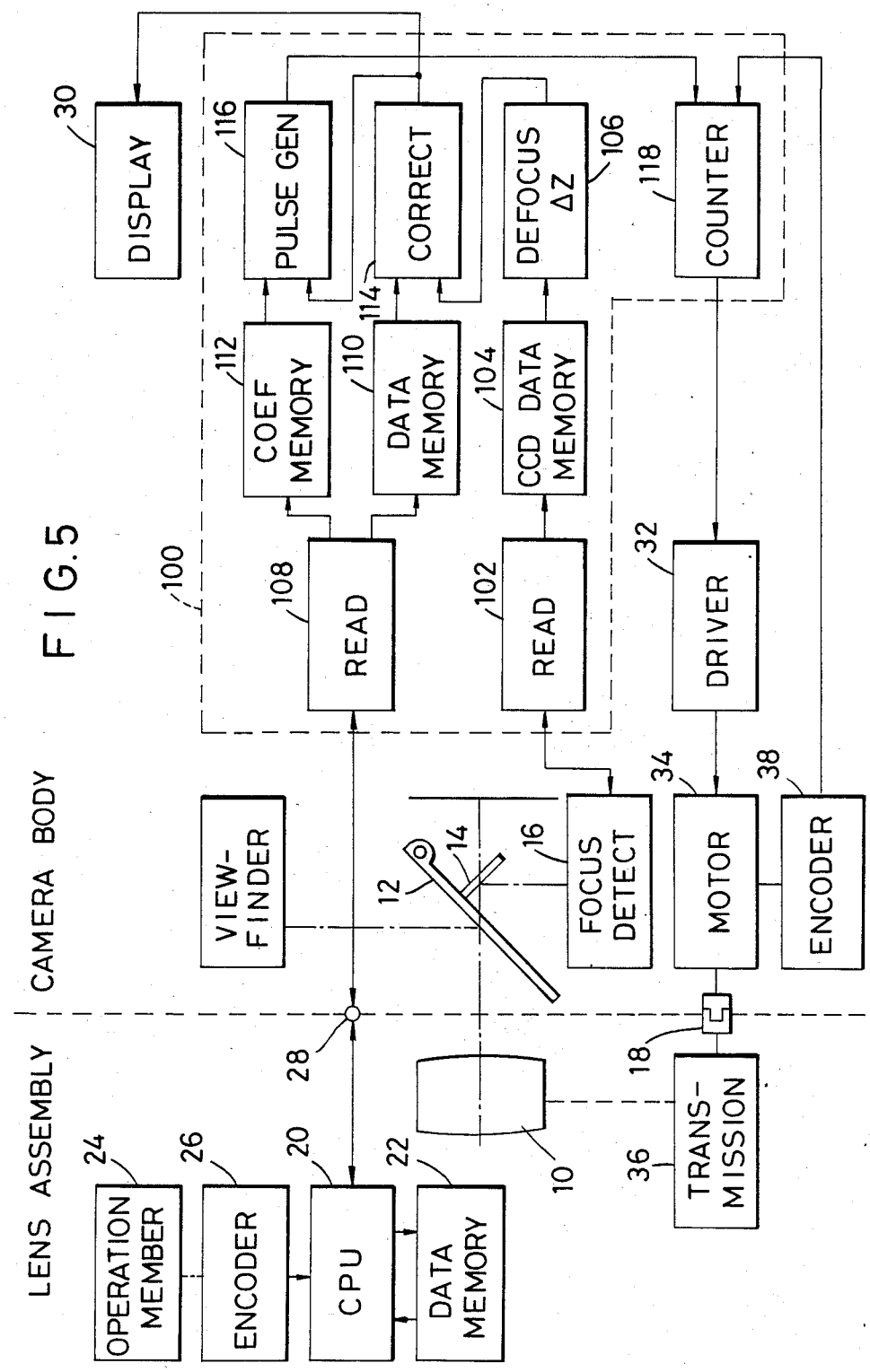
FIG. 5 is a block diagram of a camera system in an embodiment of the invention.

Next, a camera system constituted according to the aforementioned principle will be described with reference to FIG. 5. The light transmitted through a photographing lens 10 is transmitted through a semitransparent zone of a moving mirror 12 and then guided to a focus detection system 16 by way of a submirror 14. The focus detection system 16 has a construction of FIG. 1.

An image output on a pair of photoimages from a pair of photoelectric element arrays of the focus detection system 16 is stored in a CCD data memory 104 by way of a read part 102 within a microcomputer 100, and then a defocus amount $\Delta Z$ is decided in a defocus amount comprising part 106 from a relative displacement amount of the pair of photoimages according to a known method.

Here, the defocus amount $\Delta Z$ to be decided as above is a rate indicating how the optimum image plane of the photographing lens is displaced in the direction of the optical axis from the film plane. Then, the camera of FIG. 5 is adjusted mechanically or electrically so that the defocus amount $\Delta Z$ will be zero when the optimum image plane of a typical photographing lens having the aperature controlled to an F-number $F_s$ equal to the F-number of the focus detection system coincides with the film plane. Here, the camera having been adjusted mechanically indicates that the aforementioned conditions are prepared by subjecting a position of the focus detection system mechanically to fine adjustment, and the electrical adjustment indicates that the aforementioned conditions are prepared by writing a rate for adjustment in a trimmer, EPROM and the like.

A CPU 20 of the lens comprises a microcomputer incorporating ROM and RAM therein. The CPU 20 reads the position of an operating member 24 such as zooming ring, focusing ring or the like through an encoder 26 and shifts various data relating to a corresponding optical arrangement from ROM domain in the CPU 20 to RAM domain in the same CPU 20. That is, various data in the number corresponding to a division number of the encoder are included in ROM of the CPU 20, and the aforementioned first data and second data are included in the various data. Accordingly, the ROM corresponds to a data memory means 22. Then, the above-mentioned data in the ROM are contained in RAM at predetermined addresses according to a position of the encoder.

Next, contents of RAM of the CPU 20 are transmitted to a body by way of a contact 28 and then contained at predetermined addresses corresponding to a data memory 110 present in a RAM domain within the body and also at predetermined addresses corresponding to a coefficient memory 112 by way of a read part 108. The first data and the second data are loaded in the data memory 110, and a coefficient for converting the defocus amount into rotational frequency of a coupling 18 is loaded in the coefficient memory 112. A correction part 114 decides the correction rate δ given by the aforementioned eq. (1) from the first data and the second data in the data memory 110. Values of the coefficients α, β used in this case are incorporated beforehand in a program of the microcomputer as optimum values corresponding to the F-number of the focus detection system. The correction part 114 creates a corrected defocus amount ($\Delta Z - \delta$) further from the correction rate δ thus decided and the defocus amount ΔZ decided by the defocus amount computing part 106. The corrected defocus amount indicates a position of the optimum image plane at full open aperture and is transferred from the correction part 114 to a display 30. A pulse generation part 116 converts the corrected defocus amount ($\Delta Z - \delta$) into a pulse number by means of a "conversion coefficient" stored in the coefficient memory 112, sets the absolute value and code in a counter 118 and sets the code in a code bit within the counter. A driver 32 drives a motor 34 forward or backward according to a content of the code bit when a counter content exceeds a predetermined value specified as a focusing range.

The rotation of the motor 34 is transferred to a transmission 36 within the photographing lens through the coupling 18, thus driving the focusing lens 10 in a focusing direction. A rotational frequency of the coupling is counted in the ratio of, for example, 12 pulses per rotation through an encoder 38 in the camera body in this case, and the pulses are transferred to a counter 118. Upon receipt of the pulses, the counter 118 subtracts the count content, and when coming within the predetermined value corresponding to the focusing range, the driver 32 brakes to stop the lens movement.

A second embodiment of the invention will be described next. In the above-described embodiment, a correction is made so that a focusing indication of the focus detecting apparatus will be given when the optimum image plane at the time of full open aperture of the photographing lens coincides with the film plane. However, as mentioned in the foregoing U.S. Pat. No. 4,473,287, the focusing indication may be given otherwise when the optimum image plane based on the F-number controlled practically at the time of film exposure coincides with the film plane.

As in the case of the foregoing embodiment, a defocus amount is corrected so that the focusing indication will be given when the optimum image plane at the time of full open aperture whereat the depth of focus becomes shallowest coincides with the film plane in most photographing lenses, and the lens is stopped according to the defocus amount. From such construction, the depth of focus becomes deep concurrently with a shift, if any, of the optimum image plane from stopping down the aperture at the time of photographing, and therefore the focus comes within a permissible range. However, if the shift of the optimum image plane in this case is nearly 0.1 m or more, then the focus is capable of coming outside the permissible range at the time of photographing. In this case, accordingly, it is preferable that the focusing indication be given when the optimum image plane with reference to the F-number to be controlled practically coincides with the film plane. Further, the F-number $F_s$ of the focus detection system takes values of F4 to F8 in most cases, and practically the controlled F-number is greater than F4 in the majority of cases.

In view of the above circumstances, according to the second embodiment:

(1) when a controlled F-number Fc is equal to the full open aperture F-number $F_o$, or $F_c = F_o$, correction the same as in the first embodiment is carried out;

(2) when the controlled F-number $F_c$ is set at a value further stopped down from a value around the F-number $F_s$ of the focus detection system, or $F_c \gtrsim q \times F_s$; (q=0.7 to 1), the correction will not be carried out; and (3) when the controlled F-number $F_c$ comes between the full open aperture F-number $F_o$ and the value $q.F_s$ around the F-number of $F_s$ of the focus detection system, or $F_o \leq F_c < q.F_s$, a correction value interpolating both the two above will be used.

The correction rate δ ($F_c$) in the cases (2) and (3) above may be obtained as:

$$\delta (Fc) = \begin{cases} \delta \times \left[ \dfrac{q \cdot Fs - Fc}{q \cdot Fs - Fo} \right] \\ ; (Fo \leq Fc < q \cdot Fs) \\ 0; (Fc \gtrsim q \cdot Fs) \end{cases} \quad (2)$$

The method for interpolation is, needless to say, not necessarily limited thereto, and the F-number in Eq. (2) may be substituted by a corresponding APEX index value. It may be obtained more simply otherwise by means of an intermediate value between $F_c$ and $q \times F_s$ or an intermediate value $F_m$ between $F_o$ and $q \times F_s$, as:

$$\delta (Fc) = \begin{cases} p \times \delta : & Fc < Fm \\ 0; & Fc \gtrsim Fm \end{cases}$$

Next, a third embodiment wherein influence of chromatic aberration due to infrared light is taken into consideration will be described.

A filter for cutting off the infrared light is provided normally on the focus detection system, and when a cut-off wave band of the filter is to be adjusted, a construction in accordance with the third embodiment is appropriate. In the third embodiment, the first data chiefly on spherical aberration and the third data chiefly on chromatic aberration are stored in a memory of the photographing lens. With reference first to a correction of the spherical aberration, a value of deviation between both optimum image planes of the photographing lens when values of aperture are set to the F-numbers $F_o$ and $F_s$ may constitute the first data $\delta$ on the premise that the F-number $F_s$ of the focus detection system will not be altered.

The third data on chromatic aberration which is stored in the memory of the lens is used for correction of detection errors due to chromatic aberration together with a coefficient specified according to a spectral sensitivity distribution of the focus detection system.

Figure 6:
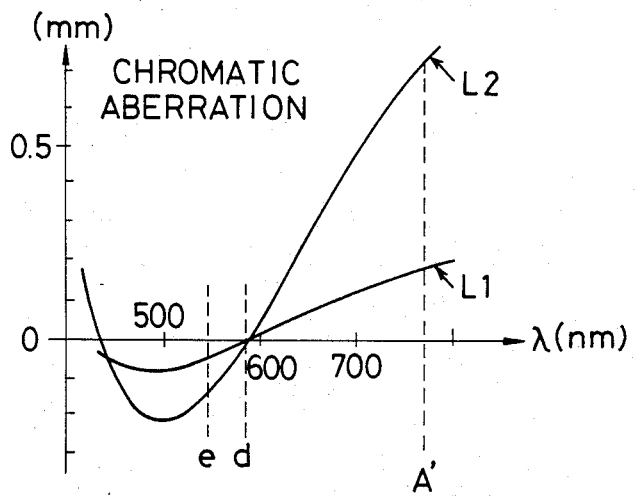
FIG. 6 is a chart showing a chromatic aberration of the photographing lens.

FIG. 6 represents chromatic aberration characteristics of typical photographing lenses L1, L2. In both characteristics, a change of long wavelength side toward a line e is nearly a straight line. Therefore data indicating the chromatic aberration may take a difference in image plane between a line A' and a line d (A' line aberration), a difference in image plane between the lines e and d, or even a difference in image plane between specific two waves on the long wavelength side toward the line e, and the values obtained through each method are essentially equal to each other except for a component of a proportional constant.

Then, the description will proceed, considering the A' line aberration as a chromatic aberration for simplicity. That is, in the case of FIG. 6, the A' line aberration of the photographing lens L1 is 180 μm, and the A' line aberration of the photographing lens L2 is 690 μm.

Figure 9:
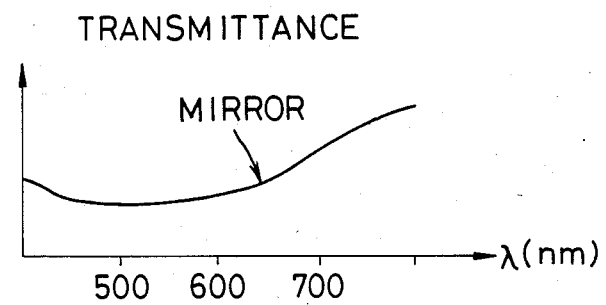
FIG. 9 is a chart showing a transmittance characteristic of a moving mirror of a camera.
Figure 10A:
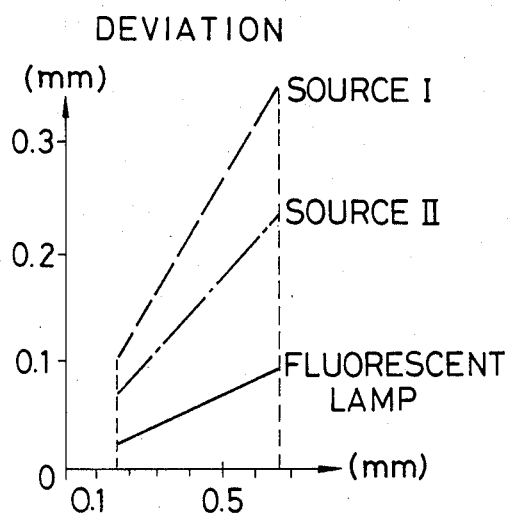
FIGS. 10A, 10B, 11A, 11B and 11C are charts showing deviations of an image plane for different light sources.
Figure 10B:
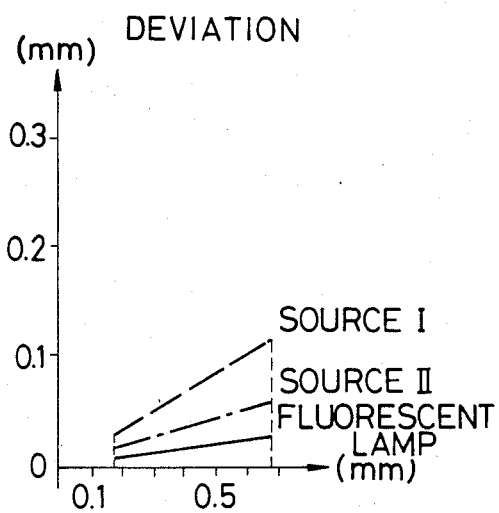

FIGS. 10A and 10B show results obtained through changing a spectral sensitivity distribution of the focus detection system by using properly three kinds of light sources (source I, source II (daylight lamps) and fluorescent lamp) and two kinds of infrared cut-off filters (R1, R2), and simulating how much detection error will arise due to chromatic aberration in each case. The quadrature axis indicates the A' line aberration of the photographing lens, and the ordinate axis of ordinate indicates the deviation $\Delta Z$ of an image plane when a focusing indication is given by the focus detecting apparatus. Each case uses a photoelectric element array and a film having the sensitivity distribution shown in FIG. 8 and a moving mirror having the transmittance characteristic shown in FIG. 9, and the direction in which the image plane is deviated is a subject side toward the film plane.

Figure 7:
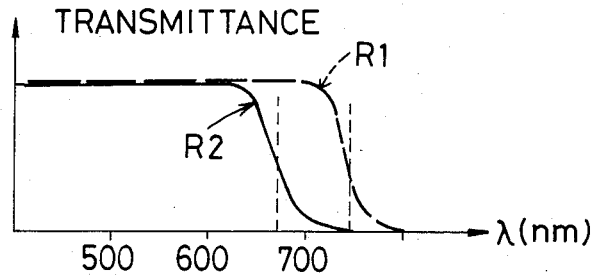
FIG. 7 is a chart showing a transmittance characteristic of an infrared cut-off filter.

FIG. 10A assumes a case where the infrared cut-off filter R1 (mesial magnitude wavelength being 750 μm or so) having the transmittance characteristic shown in FIG. 7 is used. FIG. 10B then assumes a case where the infrared cut filter R2 (mesial magnitude wavelength being 670 μm or so) is used.

As will be apparent from FIG. 10B, in the case of a focus detection system using the photographing lens L2 and the filter R2, a deviation of the image plane is suppressed to 100 μm or so even using the light source I, but in the case of focus detection system using the photographing lens L2 and the filter R1, a detection error of 300 μm or more may arise from using the light source I, as illustrated in FIG. 10A. Accordingly, it is apparent that the detection error may exceed a negligible value according to a chromatic aberration (A' line aberration) of the photographing lens unless the infrared cut-off filter is appropriate.

A correcting method for chromatic aberration will be described, next. The third data indicating a chromatic aberration is read by the microcomputer 100, and a chromatic aberration correction rate $\delta_A$ is decided, by means of coefficients $\gamma$, $\epsilon$ stored in the conversion coefficient memory 112, through:

$$\delta_A = \gamma \times (\text{third data}) - \epsilon \tag{3}$$

or an operation almost equivalent thereto. Since the cannotation of the constant term in Eq. (3) is a rate equivalent to a positional adjustment of the focus detection system, it has nothing to do particularly with aberration. If a correction only of a chromatic aberration is applied to the aforementioned defocus amount $\Delta Z$, then the defocus amount is $(\Delta Z - \delta_A)$. When the spherical aberration correction is applied additionally thereto, the defocus amount corrected with the first data and $\delta$ will be:

$$Z - p \times \delta - \delta_A; \quad (0 < p \lesssim 1)$$

A spectral sensitivity distribution characteristic of the focus detection system must be fixed before deciding the coefficient $\gamma$. There are many elements to decide the spectral sensitivity distribution. Of the elements, the infrared cut-off filter is designed so as to cut off the infrared light with a wavelength exceeding a certain value abruptly. Therefore a spectral sensitivity distribution of the focus detection system is decided mostly by a characteristic of the infrared cut-off filter.

Now, therefore, a wavelength (mesial magnitude wavelength) $\lambda_c$ whereat the sensitivity becomes $\frac{1}{2}$ on an infrared side is used as a parameter featuring the spectral sensitivity distribution. The wavelength is almost equal, in the majority of cases, to the mesial magnitude wavelength on an infrared side of the infrared cut-off filter. Accordingly, the wavelength $\lambda_c$ of the focus detection system having given a result of FIG. 10A becomes 750μ which is almost equal to the mesial magnitude wavelength of the infrared cut-off filter R1, and the wavelength $\lambda_c$ of the focus detection system having given a result of FIG. 10B is 670μ which is almost equal to the mesial magnitude wavelength of the infrared cut-off filter R2.

Figure 11A:
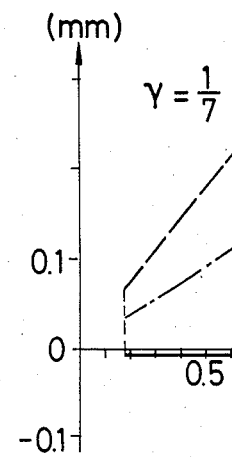
Figure 11B:
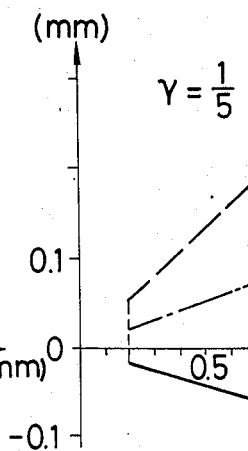
Figure 11C:
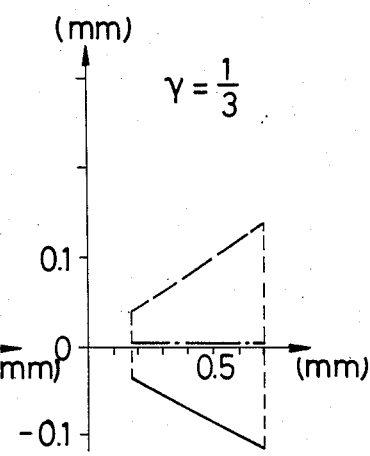

FIGS. 11A, 11B, 11C show results obtained through correcting that of FIG. 10A with the correction rate $\delta_A$ as $\gamma = 1/7$, 1/5, 1/3 respectively in Eq. (3). In FIG. 11A, it is understood that the correction is not yet sufficient to the light sources I and II, while the correction has been effected very well to the fluorescent lamp. Further in FIG. 11B, it is also understood that the correction is not yet sufficient to the light source I, while the correction has been done thoroughly to the fluorescent lamp and the light source II. Still further, in FIG. 11C, the correction has been done very well to the light source II and also thoroughly to the light source I and the fluorescent lamp. Accordingly, when the A' line aberration is used as the third data, and the wavelength $\lambda_c \approx 750$ μm, it is preferable that the correction rate be specified as:

$$1/7 \lesssim \gamma \lesssim \frac{1}{2} \tag{4}$$

Then, in consideration of the general lighting condition being nearly a luminous distribution of the white fluorescent lamp of the light source II (daylight lamp), an intermediate value between both the two, i.e.

$$1/7 \lesssim \gamma \lesssim \frac{1}{3} \tag{5}$$

will be proper, and $$\gamma = 1/5 \tag{6}$$

will be optimum.

The third data is not always to take the A' line aberration itself. Therefore referring more generally to the condition of Eq. (3), the condition (4) is $$(A' \text{ line aberration})/7 \lesssim \gamma \times (\text{third data}) \lesssim (A' \text{ line aberration})/2 \qquad (4)'$$

the condition (5) is $$(A' \text{ line abberration})/7 \lesssim \gamma \times (\text{third data}) \lesssim (A' \text{ line abberration})/3 \qquad (5)'$$

and the condition (6) is $$(A' \text{ line aberration}/5 \approx \gamma \times (\text{third data}) \qquad (6)'$$

Figure 8:
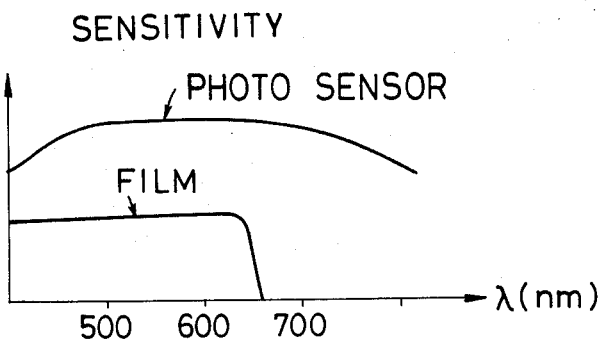
FIG. 8 is a chart showing sensitivity characteristics of a photosensor and a film.

In expressing the condition for determining a proper correction rate γ otherwise, when the film of FIG. 8 is used for photographing according to the focusing indication, γ will be decided so to have a deviation of the image plane at 0 or rearward of the film plane with reference to most photographing lenses under the fluorescent lamp lighting but forward of the film plane under lighting of the light sources I and II.

When the wavelength $\lambda_c = 670 \,\mu m$, it must be adjusted to:

$$(A' \text{ line aberration})/30 \lesssim \gamma \times (\text{third data}) \lesssim (A' \text{ line aberration})/7 \qquad (7)$$

preferable at:

$$(A' \text{ line aberration})/30 \lesssim \gamma \times (\text{third data}) \lesssim (A' \text{ line aberration})/12 \qquad (8)$$

and is optimum at:

$$(A' \text{ line aberration})/20 \approx \gamma \times (\text{third data}) \qquad (9)$$

Then, the correction rate has a linearity primary to $\lambda_c$ even when the wavelength $\lambda_c$ is other than 670 μm and 750 μm, and if so, then the condition of γ can be expressed as follows so as to satisfy Eq. (4)' when $\lambda_c = 750 \,\mu m$ and also Eq. (7) when $\lambda_c = 670 \,\mu m$:

$$q_1 \times (A' \text{ line aberration}) \lesssim \gamma \times (\text{third data}) \lesssim q_2 \times (A' \text{ line aberration}) \qquad (10)$$

$$\frac{\lambda_c - 670}{750 - 670} = \frac{q_1 - 1/30}{1/7 - 1/30} = \frac{q_2 - 1/7}{1/2 - 1/7}$$

Next described, as a fourth embodiment, will be the case where a change in F-number of the focus detection system and also the characteristic of the infrared cut-off filter is not influential.

This may be realized by a combination of the first or second embodiment and the third embodiment. That is, a defocus amount corrected to the defocus amount ΔZ is expressed by:

$$\Delta Z - p \times \delta - \delta_A; \quad (0 \lesssim p \lesssim 1)$$

and δ, $\delta_A$ are given by:

$$\delta = \alpha \times (\text{first data}) + \beta \times (\text{second data})$$

$$\delta_A = \delta \times (\text{third data}) + \epsilon.$$

That is, the three parameters (first data), (second data) and (third data) indicating an aberration characteristic of the lens are stored in a memory means of the photographing lens, coefficients α, β are stored correspondingly to F-number of the focus detection system and γ is stored correspondingly to an infrared cut-off filter characteristic, each on a camera body side, and a correction is carried out on the camera body side according to the equation given above.

In the first, second and fourth embodiments, while the first and second data on spherical aberration can be determined from an individual aberration characteristic of the line d, it is more practical to determine from the aberration characteristic to the "white" light, weighting each wavelength in harmony with a visual sensitivity or a spectral sensitivity of the typical film. That is, a moving rate of MTF peak 30 lines/mm to the "white" light, for example, on full open aperture and F4 and a moving rate on full open aperture and F8 can be specified as the first data and the second data respectively.

In the aforementioned third embodiment, the first data and the thrid data are not necessarily to correspond genuinely to spherical aberration and chromatic aberration respectively, and both the data mingled somewhat with each other will be acceptable subject to being independent to a certain extent.

Next, a description will be given regarding the significance of the correction constant term. Since constant term components are offset by a positional adjustment in the direction of optical axis of the focus detection optical system, it can be said that an arrangement of a specific value of constant term in a program of the focus detecting apparatus is not so significant.

However, in case a photographing lens having the aforementioned data memory and another photographing lens free from the data memory are included in the photographing lens group prepared for installation on a camera body incorporating the focus detecting apparatus therein, the constant term must be selected to an appropriate value so as to secure a focus detection display accurately to some extent even on the latter photographing lens, to say nothing of the former photographing lens.

With the constant term as ε, the correction rate δ when a photographing lens in which the data memory means is incorporated is obtained through:

$$\delta = \alpha \times (\text{first data}) + \beta \times (\text{second data}) + \gamma \times (\text{third data}) + \epsilon \qquad (11)$$

Figure 12:
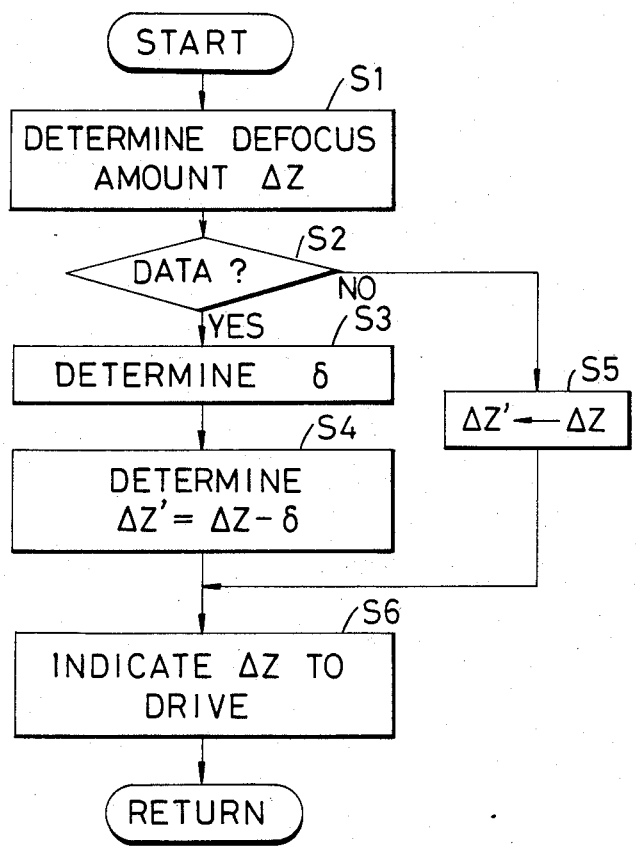
FIG. 12 is a chart representing one example of a correction rate decision means.

One example of how to decide the constant term ε comprises giving the same result from effecting or even missing the aforementioned correction at the time of full open aperture photographing on the typical lens, or deciding the constant term ε so as to keep the correction rate δ zero. A flow of the process is shown in FIG. 12.

When the defocus amount ΔZ is computed at a step S1, whether or not an installed photographing lens has the aberration data is decided at a step S2, and in the case of a photographing lens with the aberration data, the correction rate δ is computed at a step S3 according to Eq. (11). Here, the aberration data in the first data, the second data and the third data which are incorporated within the photographing lens may be read immediately before the step S3 or collecively with other lens data when the defocus amount ΔZ is decided at the step S1.

Next, a defocus amount ΔZ' corrected at a step S4 is decided according to $\Delta Z' = \Delta Z - \delta$, and a drive according to ΔZ' is indicated at a step S5. When the photographing lens is decided to be free from the aberration data at the step S2, ΔZ is applied to ΔZ' at the step S5, and the drive is indicated at the value acccordingly.

For the photographing lens free from the aberration data, the full open aperture F-number can be discriminated. Therefore a typical aberration data in the sense of statistics is created indirectly therefrom, and thus the photographing lens can be subjected to an aberration correction. Further, when a correction of the shift of image plane due to stopping-down of the lens is taken into consideration, it is advisable that the optimum image plane at the time of stopping down to F-number of the focus detection system be selected to a contact point for coherence between two types of photographing lenses for easy decision of the constant term ε.

We claim:

1. A camera system, comprising:
    a camera body having a predetermined focal plane;
    a lens assembly having a photographing optical system and installed detachably on said camera body;
    deviation detecting means provided within said camera body for detecting a deviation between the optimum image plane of a subject image formed through said photographing optical system and said focal plane;
    data storing means provided within said lens assembly storing a plurality of data including first data concerning a spherical aberration of said photographing optical system at a first F-number and second data concerning a spherical aberration of said photographing optical system at a second F-number different from said first F-number;
    coefficient storing means provided within said camera body storing a coefficient concerning said deviation detecting means; and
    means for correcting a detected deviation by means of said plurality of data and said coefficient.

2. The camera system as defined in claim 1, said correcting means comprising means for creating a correction rate according to said plurality of data and said coefficient, and another means for deciding a corrected deviation by adding the correction rate to said detected deviation.

3. The camera system as defined in claim 1, wherein said first data indicates an amount of a difference between the optimum image plane formed when said photographing optical system has a minimum F-number and the optimum image plane formed when said photographing optical system has said first F-number, said second data indicates an amount of a difference between the optimum image plane formed when said photographing optical system has the minimum F-number and the optimium image plane formed when said photographing optical system has said second F-number.

4. The camera system as defined in claim 3, wherein said first F-number is at least 1.5 times as great as said second F-number.

5. The camera system as defined in claim 1, said plurality of data further including third data indicating an amount of chromatic aberration of said photographing optical system.

6. The camera system as defined in claim 5, further comprising means for focusing said photographing optical system according to the deviation corrected by said correcting means, wherein the coefficient stored in said coefficient storing means is decided so as to position an image plane focused by the focusing means on said focal plane or on the side thereof away from a subject when said subject is lighted by a fluorescent lamp, and on the subject side of said focal plane when said subject is lighted by a daylight color light source.

7. A camera system, comprising:
    a camera body having a predetermined focal plane;
    a lens assembly having a photographing optical system and installed detachably on said camera body;
    deviation detecting means provided within said camera body for detecting a deviation between the optimum image plane of a subject image formed through said photographing optical system and said focal plane;
    data storing means provided within said lens assembly storing a plurality of data including first data concerning a spherical aberration of said photographing optical system at a first F-number and second data concerning a spherical aberration of said photographing optical system at a second F-number different from said first F-number; and
    means for correcting a detected deviation on the basis of said plurality of data.

8. A camera system, comprising:
    a camera body having a predetermined focal plane;
    a lens assembly having a photographing optical system and installed detachably on said camera body;
    deviation detecting means provided within said camera body for detecting a deviation between the optimum image plane of a subject image formed through said photographing optical system and said focal plane;
    data storing means provided within said lens assembly storing a plurality of data concerning spherical aberration of said photographing optical system with respect to different F-numbers;
    coefficient storing means provided within said camera body storing a coefficient concerning said deviation detecting means; and
    means for correcting a detected deviation by means of said plurality of data and said coefficient.

9. A photographing lens assembly installed detachably on a camera body, comprising:
    a photographing optical system;
    stopping means for modifying an F-number; and
    storing means provided within said lens assembly and having stored therein first data indicating an amount relating to a spherical aberration of said photographing optical system at a first F-number and second data indicating an amount relating to a spherical aberration of said photographing optical system at a second F-number different from said first F-number.

10. The photographing lens assembly as defined at claim 9, wherein said first F-number is within the range of F3 to F6, and said second F-number is within the range of F6 to F10.

11. A photographing lens assembly installed detachably on a camera body, comprising:
    a photographing optical system;
    stopping means for modifying an F-number; and
    storing means provided within said lens assembly and having stored therein first data indicating an amount of a positional difference between an optimum image plane formed by said photographing optical system when the photographing optical system has a minimum F-number and the optimum image plane formed when the photographing optical system has a first F-number and second data indicating an amount of a positional difference between the optimum image plane formed by said photographing optical system when the photographing optical system has the minimum F-number and the optimum image plane formed when the photographing optical system has a second F-number different from said first F-number.

12. The photographing lens assembly as defined in claim 11, wherein said first F-number is within the range of F3 to F6, and said second F-number is within the range of F6 to F10.

13. The photographing lens assembly as defined in claim 12, wherein said second F-number is at least 1.5 times as great as the first F-number.

14. A photographing lens assembly installed detachably on a camera body, comprising:
 a photographing optical system; and
 storing means provided within said lens assembly and having stored therein first data indicating an amount relating to a spherical aberration of said photographing optical system at a first F-number and second data indicating an amount relating to a spherical aberration of said photographing optical system at a second F-number different from said first F-number.

15. The photographing lens assembly as defined in claim 14, wherein said first F-number is within the range of F3 to F6, and said second F-number is within the range of F6 to F10.

16. The photographing lens assembly as defined in claim 14 further comprising means for selecting one of said first data and said second data and reading out the selected one data from said storing means.

17. A photographing lens assembly installed detachably on a camera body, comprising:
 a photographing optical system having a minimum F-number thereof;
 storing means provided within said lens assembly and having stored therein first data indicating an amount of a positional difference between an optimum image plane formed by said photographing optical system at said minimum F-number and the optimum image plane formed at a first F-number and second data indicating an amount of a positional difference between the optimum image plane formed by said photographing optical system at said minimum F-number and the optimum image plane formed at a second F-number different from said first F-number.

18. The photographing lens assembly as defined in claim 17, wherein said first F-number is within the range of F3 to F6, and said second F-number is within the range of F6 to F10.

19. The photographing lens assembly as defined in claim 18, wherein said second F-number is at least 1.5 times as great as the first F-number.

20. The photographing lens assembly as defined in claim 17 further comprising means for selecting one of said first data and said second data and reading out the selected one data from said storing means.

* * * * *